(Model.) 2 Sheets—Sheet 1.

F. J. PERKINS.
CORN PLANTER.

No. 278,455. Patented May 29, 1883.

Witnesses:
John A. Ellis.
Fuller Walker.

Inventor:
F. J. Perkins
By David A. Burr
Attorney.

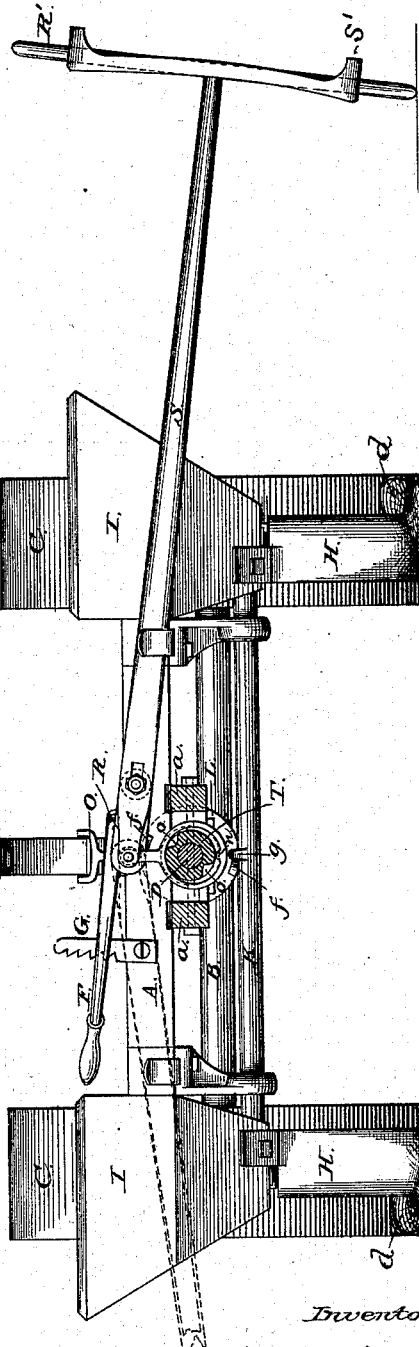

UNITED STATES PATENT OFFICE.

FRANKLIN J. PERKINS, OF WOBURN, MASSACHUSETTS.

CORN-PLANTER.

SPECIFICATION forming part of Letters Patent No. 278,455, dated May 29, 1883.

Application filed June 14, 1882. (Model.)

*To all whom it may concern:*

Be it known that I, FRANKLIN J. PERKINS, of Woburn, Middlesex county, Massachusetts, have invented certain new and useful Improvements in Corn-Planters; and I do hereby declare that the following is a full, clear, and exact description thereof, reference being had to the accompanying drawings, and to the letters of reference marked thereon, making a part of this specification.

My invention relates to corn-planters which are adapted not only to the sowing and covering of the seed at proper intervals, but to the marking off of a line for the next row, and of the proper position for each hill in the row.

It has for its object, first, the saving of all labor in a preliminary marking and checking of a field to be planted by causing the planting-machine to mark and check the succeeding row as it plants the first row; and, second, the attainment of greater simplicity in the construction of the machine, with the utmost efficiency in its practical operation.

It consists, first, of a novel marking and checking device placed at the front part of the machine and adapted to be readily thrown into position for operation to the right or to the left, and which is actuated by a central shaft geared to the driving-axle, said shaft serving to operate likewise the dropper-slides in the two seed-hoppers; second, in the combination of a stop with the clutch-lever and sliding bevel-wheel on said shaft, so that the bevel-wheel can be uncoupled from the driving-gear only at the moment when the dropper-slides are about to open and the check-marker to fall and make its impress, and when uncoupled shall remain locked in this position until the machine is ready to start up again. Hence, when the machine is about to start in a new row the driver can place it in proper position to cover the hills, and then upon throwing the shaft into gear and starting the team the planting and checking will proceed uniformly with that which has preceded it.

Figure 1:
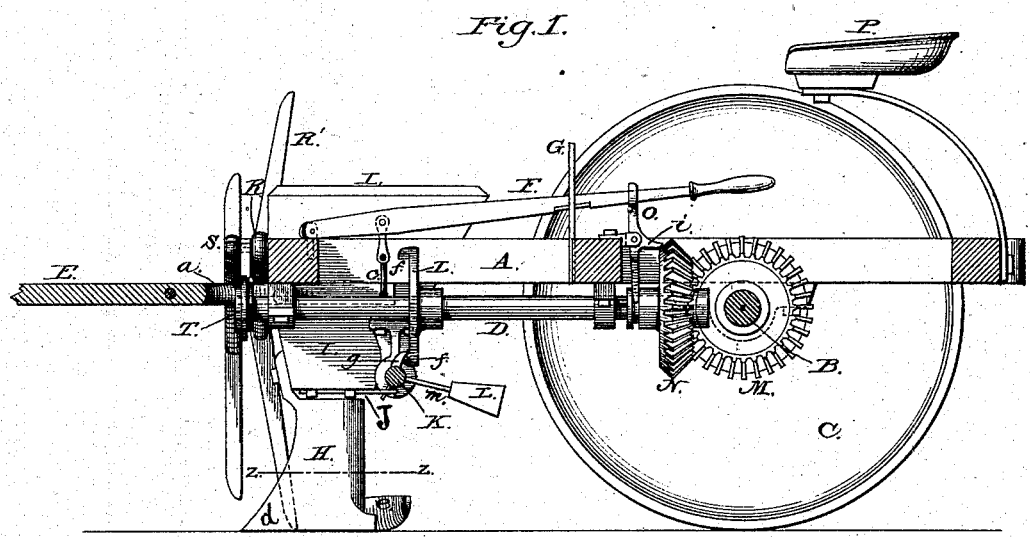
Figure 2:
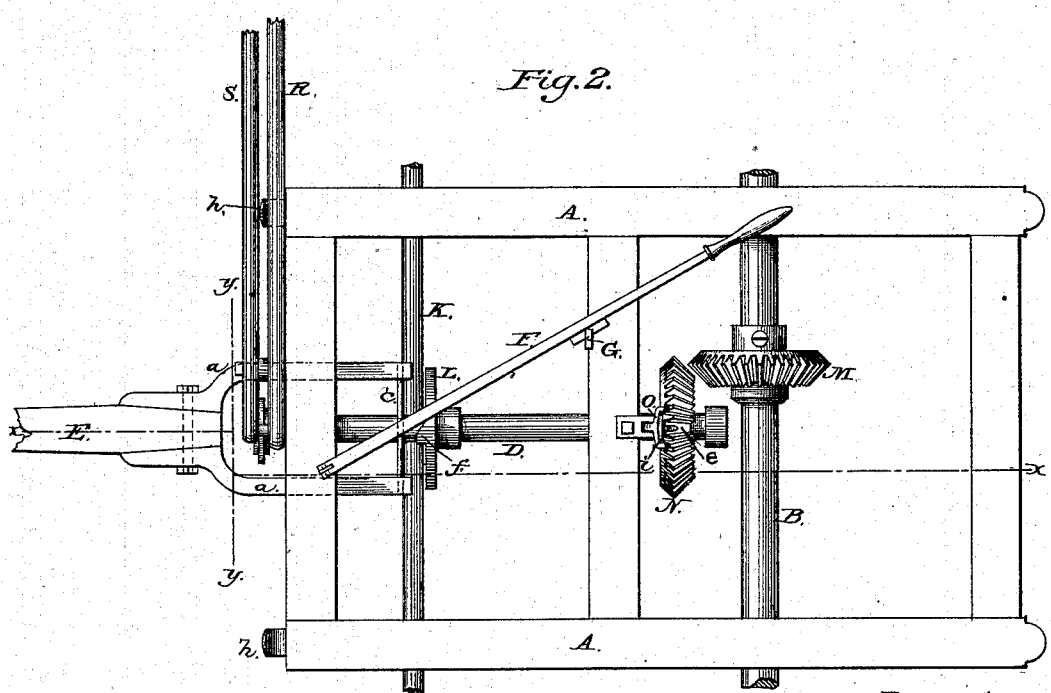

In the accompanying drawings, Figure 1 is a longitudinal section of my improved planter in line $xx$ of Fig. 2. Fig. 2 is a top view thereof with the wheels and seed-boxes removed.
Fig. 3 is a section in line $yy$ of Fig. 2, showing the connection of the checker and marker with the frame and operating-shaft. Fig. 4 is a transverse section of one of the plows in line $zz$ of Fig. 1.

A is the frame of the machine; B, the axle left free to rotate in boxes secured to the frame; C, the wheels which may be connected with the axle by pawls and ratchets or other equivalent device, which will cause them to engage the axle when driven forward, but allows them to turn independently thereof when run backward. The wheels are made with wide flat rims, so as to pass readily over loose-ploughed ground.

D is a shaft supported in journal-boxes under the frame at right angles with the axle to extend from the axle forward to the front of the frame.

E is the tongue of the machine. The tongue-hounds $a$ $a$ are pivoted to the under side of the front cross-bar of the frame on either side of the end of the shaft D, and their ends, projecting rearwardly, are connected by a transverse rod, $c$.

A lever, F, pivoted to the upper side of the cross-bar of the frame, extends thence rearwardly diagonally over the center of the rod $c$, to which it is coupled by a link, so that by lifting the rear end of the lever, when the forward end of the tongue is supported by the team, the front end of the frame and the plows carried thereby may be lifted to adjust their height. A notched standard, G, is fitted upon the central cross-bar of the frame to engage the inner end of the lever F and hold it when it has been elevated to lift the plows.

H H are tubular plows, secured under the seed-hoppers I, which are fastened to the outside of the frame at its front end in line with the wheels. The hoppers are fitted with dropper-slides J of the usual form, operating to drop at each movement a sufficient amount of corn for planting one hill. The grain dropping from the slide falls through the tubular conduit in each plow upon cross-bars fitted in its lower end, which serve to separate and distribute the grains just as they strike the ground.

Each plowshare $d$ is constructed to enter the ground a short distance beneath the surface and to lift a horizontal layer of soil, which is then forced back by the forward movement of the machine in and through a horizontal trough, $e$, formed with a semicircular curve around the outer lower side of the tubular portion of the plow, so as to terminate in the rear thereof, and there discharge the layer of soil upon the grain meantime deposited in the furrow formed by the plow. The grain is thus covered to the proper depth, the furrow in which they are contained is filled up, and the wide wheels, following in the track of the plows, roll and compact the soil upon the seed.

The dropper-slides J are operated by means of a rock-shaft, K, extending from the one to the other at right angles to the central shaft, D, and immediately beneath it. The face of a disk, L, secured upon the shaft D adjacent to the rock-shaft K, is fitted with two cams, $f f$, to project therefrom at diametrically-opposite points, and which, in the revolution of the disk, strike against an arm, $g$, projecting vertically from the rock-shaft K, and, forcing it over, cause it to rock or oscillate in its bearings sufficiently to open the slides in the hoppers at either end of the shaft. So soon as the cam $f$ has thus thrown over the shaft K it is disengaged from the arm $g$ and the shaft is made to resume instantly its normal position and close the dropper-slide by the action of the weight L upon a second arm, $m$, projecting horizontally from the shaft, as shown in Fig. 1. Thus each half-revolution of the central shaft will produce a movement of the dropper-slide and deposit the proper amount of grain in each hill.

The shaft D is geared at pleasure with the axle B by means of a beveled wheel, M, fixed on the latter and a corresponding beveled wheel, N, adapted to slide to and from it upon the end of the shaft D, to which it is connected by a spline. The bevel-wheel N is thrown in and out of gear by means of a lever, O, pivoted to the side of the cross-bar of the frame, and whose lower end engages a collar on the hub, while its upper end projects upward within reach of the driver's foot. From the pivotal center of the lever an arm, $i$, projects at a right angle toward the rim of the bevel-wheel in line therewith, so as to strike against it when the lever is in its upright position and the wheels M N are in gear. A throw of the lever to disengage the bevel-wheels is thus prevented until the pin enters one of the notches $e$, cut at diametrically-opposite points in the rim of the wheels N, said notches being so located with reference to the cams on the disk L, operating the dropper-slides, as that each notch shall register with the pin $i$ and allow the lever to be thrown and the wheels to be disengaged at the moment that the dropper-slides are about to be opened; hence the revolution of the shaft D and the movement of the dropper-slides are arrested invariably at the moment when the slides are about to open, so that a delivery of grain will follow immediately upon the throw of the lever setting the shaft D in motion. This permits the driver to control with precision the point at which the delivery of grain shall begin when he enters upon a new row. The driver's seat P is supported centrally from the rear cross-beam, so that his feet may rest upon the central beam. The marker, by which the next row is laid off as the machine moves over the ground in planting the first, consists of a bar or beam, R, of suitable length, whose inner end is pivoted to the center of the outer front face of the frame A over the tongue-hounds, so that it may be shifted over from one side to the other, as occasion shall require. It is armed at its outer end with a vertical cross-bar, R', whose lower end serves to mark the ground as it is drawn over it. The beam is supported in horizontal position at the proper height on either side of the machine by means of brackets $f f$ at each end of the frame.

S is a check-marking rod, pivoted, near to its inner end, to the outer face of the marking-beam R upon a pivot-bolt secured to the beam, but which passes through a slot in the check-rod. The outer end of the rod is fitted with a vertical cross-arm, S', terminating in wedge-shaped heads, which, when the rod drops, produce a check-mark in the soil at right angles to the marked row. The inner end of the rod is pivoted to an arm extending from a ring encircling a wheel, T, fixed on the end of the shaft D, between the tongue-hounds $a a$. Two notches, $o o$, are cut in the periphery of the wheel T at diametrically-opposite points corresponding in position with the cams $f$ on the disk L. A stud, $n$, is made to project on the inner periphery by the lower side of the ring, and the ring is left loose enough to permit this stud to ride over the periphery of the wheel. As the wheel rotates with the shaft the weight of the long rod S operates to bear the stud $n$ upward against the wheel and to cause it to drop into each notch $m$ in turn as it comes in to register therewith. The drop of the pin into the notch allows the outer end of the check-rod to fall suddenly, so that its head shall indent and check-mark the line scored by the marking-beam. The sides of the notches $m$ are so inclined as that at each rotation of the wheel the stud $n$, after dropping into a notch, will be readily lifted out therefrom, and thus operate to raise the outer end of the check-rod in readiness to fall again at each half-revolution of the shaft. As the notches $m$ are in line with the cams $f$, operating the dropper-slides, the check-rod falls simultaneously with the dropping of the corn from the hoppers. The slot through which the pivot-bolt passes permits the check-rod to be thrown over from one side of the machine to the other with the marking-beam. (See dotted lines, Fig. 3.)

I claim as my invention—

1. The combination, with the pivoted shifting marker-beam R and its cross-arm R', of the parallel vibrating check-rod S, of equal length with the marker-beam, pivoted thereto to vibrate independently thereon, and armed at its outer end with a cross-arm and checking-heads, S', which shall, as the rod vibrates, rise and fall in line with and parallel to the marker R', all substantially in the manner and for the purpose herein set forth.

2. The combination, with the shaft D, geared to the axle B and adapted to move the seed-dropping slides J, of a wheel, T, upon the end of said shaft, a ring dependent from the short inner arm of the check-rod S to encircle said wheel loosely, and a stud, $n$, on its inner periphery, adapted to drop into one or more notches, $o\ o$, formed in the periphery of the wheel, and thus allow the outer end of the check-rod to fall as each notch is reached, all substantially in the manner and for the purpose herein set forth.

3. The combination of the disk L upon the rotating shaft D, and the cams $ff$ upon the face thereof, with a rock-shaft, K, at right angles to the shaft D, an arm, $g$, projecting from the rock-shaft to be actuated by the cams $f$ to throw the shaft in one direction, a weight, W, to produce its return, and reciprocating seed-slides J, actuated by the movements of the rock-shaft, substantially in the manner and for the purpose herein set forth.

4. The rock-shaft K, actuating the seed-slides J, the vibrating check-rod S for checking the row-markers, and the rotating shaft D and its cam devices $ff$ and $mm$, serving to actuate simultaneously the rock-shaft and the vibrating check-rod at equal intervals in the rotation of the shaft, all combined and operating automatically substantially in the manner and for the purpose herein set forth.

5. The combination, with a sliding bevel-wheel, N, fitted to slip lengthwise upon a spline on the end of the shaft D in and out of gear with a bevel-wheel, M, upon the axle B of the machine, and with a pivoted shifting-lever, O, whose lower end engages the hub of the sliding wheel to move it, of an arm, $i$, projecting at right angles from the pivotal center of said lever to bear against the inner rim of the wheel N, and thereby prevent any movement of the lever when the wheel is thrown into gear until the arm shall register with a notch, $e$, cut in the rim of the wheel to permit the lever to drop forward to shift the wheel and lock it, substantially in the manner and for the purpose herein set forth.

6. The combination, with the shifting-lever O, the sliding bevel-wheel N, actuated thereby, the crank-arm $i$, bearing upon the rim of the wheel, notches $e\ e$, cut at opposite points in said rim to permit the lever to drop and shift the wheel, and the shaft D, governed by said bevel-wheel, of cams $ff$ upon the disk L, actuating the rock-shaft K and seed-slides J, so that the rotation of the wheel N and shaft D shall be arrested and locked at the moment the cams are about to actuate the rock-shaft and open the seed-slides, substantially in the manner and for the purpose herein set forth.

In testimony whereof I have signed my name to this specification in the presence of two subscribing witnesses.

FRANKLIN J. PERKINS.

Witnesses:
EDWARD W. CRANDALL,
SHERMAN CONVERSE.